(12) United States Patent
Belhachemi et al.

(10) Patent No.: US 11,662,702 B2
(45) Date of Patent: May 30, 2023

(54) METHOD FOR PROTECTING THE PRODUCTION DATA FOR PRODUCING A PRODUCT

(71) Applicant: Siemens Aktiengesellschaft, Munich (DE)

(72) Inventors: Omar Belhachemi, Munich (DE); Rainer Falk, Poing (DE); Christian Peter Feist, Munich (DE); Kai Fischer, Baldham (DE); Daniela Friedrich, Munich (DE); Steffen Fries, Baldham (DE); Markus Heintel, Munich (DE)

(73) Assignee: SIEMENS AKTIENGESELLSCHAFT

( * ) Notice: Subject to any disclaimer, the term of this patent is extended or adjusted under 35 U.S.C. 154(b) by 277 days.

(21) Appl. No.: 16/954,109

(22) PCT Filed: Nov. 15, 2018

(86) PCT No.: PCT/EP2018/081357
§ 371 (c)(1),
(2) Date: Jun. 16, 2020

(87) PCT Pub. No.: WO2019/120786
PCT Pub. Date: Jun. 27, 2019

(65) Prior Publication Data
US 2020/0333757 A1    Oct. 22, 2020

(30) Foreign Application Priority Data
Dec. 22, 2017 (EP) .................................. 17210288

(51) Int. Cl.
*G05B 19/042* (2006.01)
*G05B 9/02* (2006.01)
(Continued)

(52) U.S. Cl.
CPC ........... *G05B 19/0428* (2013.01); *G05B 9/02* (2013.01); *H04L 9/002* (2013.01); *H04L 9/3066* (2013.01); *G05B 2219/36542* (2013.01)

(58) Field of Classification Search
CPC .............. G05B 19/0428; G05B 9/02; G05B 2219/36542; H04L 9/002; H04L 9/3066
See application file for complete search history.

(56) References Cited

U.S. PATENT DOCUMENTS 8,300,811 B2  10/2012  Georgiades et al.
8,531,247 B2   9/2013  Dichtl
(Continued)

FOREIGN PATENT DOCUMENTS

CN   1702582 A   11/2005
CN   1860420 A   11/2006
(Continued)

OTHER PUBLICATIONS

PCT International Search Report dated Apr. 8, 2019 corresponding to PCT/EP2018/081357 filed on Nov. 15, 2018.
(Continued)

*Primary Examiner* — Christopher E. Everett
(74) *Attorney, Agent, or Firm* — Schmeiser, Olsen & Watts LLP

(57) ABSTRACT

Provided is a method for producing a product by a machine tool, wherein the control information and/or production data of a machine tool, such as a milling machine, injection molding machine, welding robot, laser cutter or 3D printer, is protected or cryptographically encrypted such that unauthorized copying or modifying is prevented, including the steps: producing product by the machine tool taking into consideration control information which controls the production of the product; generating production data by the machine tool during production of the product, wherein the
(Continued)

production data describes the production of the product; providing protection information to the machine tool, which indicates which of the production data is to be protected, and defines a protection method for the production data which is protected; and protecting that production data which, according to the protection information, is to be protected, by the protection method defined by the protection information.

11 Claims, 3 Drawing Sheets

(51) Int. Cl.
*H04L 9/00* (2022.01)
*H04L 9/30* (2006.01)

(56) References Cited

U.S. PATENT DOCUMENTS

| | | | |
|---|---|---|---|
| 8,843,761 | B2 | 9/2014 | Meyer et al. |
| 8,892,616 | B2 | 11/2014 | Dichtl |
| 9,147,088 | B2 | 9/2015 | Falk et al. |
| 9,584,311 | B2 | 2/2017 | Meyer et al. |
| 2002/0116623 | A1 | 8/2002 | Bussert |
| 2004/0151308 | A1* | 8/2004 | Kacker ............... H04L 63/101 380/30 |
| 2005/0027376 | A1 | 2/2005 | Lucas et al. |
| 2007/0136818 | A1 | 6/2007 | Blumberg et al. |
| 2009/0125917 | A1 | 5/2009 | Parker et al. |
| 2009/0165126 | A1 | 6/2009 | Jung et al. |
| 2013/0132730 | A1 | 5/2013 | Falk |
| 2013/0156180 | A1 | 6/2013 | Hess |
| 2015/0264080 | A1 | 9/2015 | Jens-Uwe et al. |
| 2016/0086242 | A1 | 3/2016 | Schafer et al. |
| 2016/0180061 | A1 | 6/2016 | Pogorelik et al. |
| 2016/0253438 | A1 | 9/2016 | Boffgen et al. |
| 2018/0012311 | A1* | 1/2018 | Small ............... B33Y 50/02 |
| 2018/0096175 | A1* | 4/2018 | Schmeling ........ B29C 64/10 |
| 2018/0173203 | A1* | 6/2018 | Freer ............... G05B 19/4099 |
| 2018/0178451 | A1* | 6/2018 | Gosch ............... G06F 21/608 |
| 2018/0356796 | A1* | 12/2018 | Godfrey ............. B33Y 50/02 |

FOREIGN PATENT DOCUMENTS

| | | |
|---|---|---|
| CN | 101403905 A | 4/2009 |
| CN | 101776878 A | 7/2010 |
| CN | 201816279 U | 5/2011 |
| CN | 102945025 A | 2/2013 |
| CN | 103053131 A | 4/2013 |
| CN | 105291440 A | 2/2016 |
| CN | 106774201 A | 5/2017 |
| DE | 10125383 A1 | 6/2002 |
| DE | 102015006512 A1 | 12/2016 |
| EP | 0289102 A2 | 11/1988 |
| EP | 1150190 A2 | 10/2001 |
| EP | 1901147 A1 | 3/2008 |
| EP | 2870565 A1 | 5/2015 |
| EP | 2891102 A1 | 7/2015 |
| EP | 2605445 B1 | 9/2015 |
| EP | 3028140 A1 | 6/2016 |
| EP | 2976707 B1 | 2/2017 |
| EP | 3413530 A1 | 12/2018 |
| JP | 2009230621 A | 10/2009 |
| WO | 2017137256 A1 | 8/2017 |
| WO | WO-2018091091 A1 * | 5/2018 ........... B29C 64/393 |

OTHER PUBLICATIONS

European Search Report for Application No. 17210288.1, dated Jul. 10, 2018.
Zhang, Wei et al:"Method for Data Storing Based on Coding Vector Encryption in WSNs"; Nov. 30, 2015; vol. 42 No. 11 A.
Adhikari, Anku et al: "Trust Issues for Big Data about High-Value Manufacured Parts" 2016 IEEE 2nd International Conference on Big Data Security on Cloud (BigDataSecurity), IEEE International Conference on High Performance and Smart Computing (HPSC), and IEEE International Conference on Intelligent Data and Security (IDS).

\* cited by examiner

METHOD FOR PROTECTING THE PRODUCTION DATA FOR PRODUCING A PRODUCT

CROSS-REFERENCE TO RELATED APPLICATIONS

This application claims priority to PCT Application No. PCT/EP2018/081357, having a filing date of Nov. 15, 2018, which is based off of EP Application No. 17210288.1, having a filing date of Dec. 22, 2017, the entire contents both of which are hereby incorporated by reference.

FIELD OF TECHNOLOGY

The following relates to a method for the manufacture of a product with a machine tool, and to a machine tool for the manufacture of a product.

BACKGROUND

A machine tool such as, for example, a laser cutter or a 3D printer can be used for the manufacture of a product. The manufacture of the product can here be controlled by control information. The control information can, for example, specify process steps and/or process parameters of the machine tool. Protecting the control information in such a way that it cannot be copied, for example on the basis of encryption methods, is known. There can, however, be a risk that the control information can be derived from production data that are generated during the manufacture of the product.

The document U.S. Pat. Nos. 8,531,247 B2, 8,892,616 B2, 8,300,811 B2, 9,147,088 B2, 9,584,311 B2, the document EP 2976707 B1, the document EP 2 605 445 B1, the document EP 2 870 565 A1, the document EP 2 891 102 A1, the document WO 2017137256 A1, the document EP 2870565 B1, the document EP 3028140 B1, the document EP 17175275 and the document U.S. Pat. No. 8,843,761 B2 are known from the conventional art.

SUMMARY

Against this background, an aspect relates to that of creating an improved manufacture of a product.

According to a first aspect, a method is proposed for the manufacture of a product with a machine tool. The method comprises:

manufacture of the product with the machine tool giving consideration to control information that controls the manufacture of the product;

generation of production data by the machine tool during the manufacture of the product, wherein the production data describe the manufacture of the product;

provision of protection information to the machine tool indicating which parts of the production data are to be protected and defining a protection method for this production data requiring protection; and protection of those parts of the production data that are to be protected in accordance with the protection information with the protection method defined by the protection information.

The machine tool is in particular a machine for the manufacture/production of products on the basis of a tool whose movement is specified by the machine. The machine tool can be designed at least partially as a milling machine, a press, a saw, an injection molding machine, a welding robot, a laser cutter or a 3D printer. The manufacture of the product can, for example, comprise welding, cutting, additive fabrication and/or milling.

The product is in particular a workpiece that is processed, manufactured and/or modified by the machine tool. The product can, for example, be a piece of metal that is milled into a predetermined shape with a milling machine. The manufactured product is not necessarily a final product; it can also be an intermediate product.

The control information in particular defines how the machine tool is to be operated in order to manufacture the product. The manufacture of the product takes place in particular in accordance with the control information. The control information can, for example, define process parameters of the machine tool. These process parameters can comprise an intensity of a laser, a composition of shield gases or lubricants used, a milling speed, a milling rotation rate or the like. The control information can further contain manufacturing data that specify the manufacturing steps of the machine tool and are e.g. a 3D printing file, a milling program and/or a CNC (computerized numerical control) program. The control information can also be referred to as production control information and/or project information.

The control information can be protected, for example in that it is cryptographically encrypted. The protection of the control information can also be controlled through digital rights management (DRM). Through the protection of the control information it is in particular possible to prevent it from being copied in an unauthorized manner and being employed otherwise for the operation of other machine tools. The control information can furthermore be given integrity protection through a cryptographic checksum, for example a digital signature or a message authentication code.

The production data can be generated by the machine tool during the manufacture of the product. This can, for example, be log data and/or monitoring data that characterize the manufacture of the product. The production data can be acquired by sensors during the manufacture of the product, and for example describe a temperature, oscillations, acoustic emissions or forces arising during the manufacture. In one variant, the production data can also comprise test data or inspection data of the manufactured product that are determined during the production process. They can be acquired by sensors that are integrated into the machine tool or that are connected to the machine tool. The production data can also be referred to as manufacturing process data. The production data can, for example, be analyzed by a user of the machine tool and/or by an external monitoring device in order to check whether the manufacture of the product has been carried out correctly by the machine tool.

The production data can be protected in accordance with the protection information. The protection information indicates in particular whether and how the production data are to be protected. How the production data are to be protected is defined in particular in the protection method that can be part of the protection information. The protection information can, for example, indicate that the production data are not to be protected, are to be protected cryptographically, and/or are to be kept secret.

The protection information can also stipulate a protection level for the production data, wherein the protection level can for example define a low-level protection, a medium level of protection or a high level of protection. The protection information can also determine a suitable protection for the production data depending on an importance of the production data.

The production data are protected by the protection method in particular giving consideration to the protection information. The production data for which the protection information prescribes a cryptographic protection can here, for example, be encrypted. The production data that, according to the protection information, are not to be protected are not protected, in particular are not encrypted.

The production data for which protection is required can, in particular, be protected in the manufacturing method by the machine tool. The appropriate protection can here be prescribed by the protection method of the protection information. The content of the production data can be protected in that the production data can be protected. If the production data are encrypted, only a device with a suitable decryption key can decrypt the production data and read the content of the production data.

In some forms of embodiment, the production data are provided to external devices after the manufacture of the product. Access from the external devices to the production data can be restricted through the protection of the production data.

The possibility that unauthorized external devices and/or users obtain the content of the production data or modify it in an unauthorized manner and, for example, derive the control information therefrom is in particular prevented. The production data, and thus also the control information, can in particular be protected during the manufacture of the product.

According to one form of embodiment, the protection information defines different protection methods for different production data categories, wherein each production data category comprises multiple production data which are generated during the manufacture of a single product and/or which are generated during the manufacture of different products with the machine tool.

Multiple production data can be assigned to different production categories. The multiple production data can be those such as are generated during the manufacture of a single product and/or those such as are generated during the manufacture of different products.

It is for example possible that all production data that describe a first manufacturing step fall into a first production data category, and all production data that describe a second manufacturing step fall into a second production data category. It is also possible to determine the production data categories of production data depending, for example, on a time at which the production data were generated.

In particular, a unique item of protection information is not present for every item of generated production data. The protection information can instead also define a protection for all the production data of a production data category as a group. The scale of the protection information can thereby be significantly reduced for example.

According to a further form of embodiment, the protection method determines whether the production data to be protected are to be provided in a restricted manner, are not to be provided, and/or are to be provided in cryptographically encrypted form.

Production data that are not to be provided are in particular to be protected by the manufacturing device in such a way that they are not output to external devices outside the manufacturing device. This means, for example, that these production data are kept secret by the manufacturing device.

The production data for which the protection method prescribes a restricted provision are only partially provided to external devices. Which part of these production data is provided to the external devices can be specified by the protection method.

The production data that are to be provided in cryptographically encrypted form are in particular only transmitted to external devices when they are encrypted by a cryptographic key. The cryptographic key can be provided by the protection information.

According to a further form of embodiment, the method further comprises provision of the protected production data to a user, to a memory device, to an external device, to a block chain, to a cloud service, to an Internet-of-things platform and/or to a network.

The production data are in particular provided in protected form. The user is, for example, a user of the machine tool, for example a machine maker. The user can access the production data manually. The production data can also be provided to the user automatically, for example via a local or cloud service.

The memory device is, for example, a RAM memory, a cloud service, an SD card, a USB memory or a hard disk. All devices that are not part of the machine tool, for example analysis devices for analyzing the production data, come under the external device.

The protected production data can also be written into a block chain as one or a plurality of additional blocks. The block chain is, for example, a Bitcoin, Ethereum, Chain, IOTA or Hyperledger blockchain. The production data can be provided in encoded form as a transaction data structure of the block chain for incorporation into a block of the block chain.

The network can be either a public or a private network.

The provision of the production data can take place wirelessly or via a cable. The provision can, for example, take place via a network connection such as an Ethernet connection or a WLAN connection. FTP (file transfer protocol), SFTP (secure file transfer protocol), SCP (secure copy protocol), HTTP (hypertext transfer protocol), HTTPS (hypertext transfer protocol secure), OPC UA (OPC unified architecture), SMTP (simple mail transfer protocol), XMPP (extensible messaging and presence protocol) or MQTT (message queuing telemetry transport) protocols for example can be used as the protocols for the transmission of the production data.

According to a further form of embodiment, the protection information is stored in a memory unit of the machine tool.

The protection information has in particular a fixed definition, and is thus permanently stored in the memory unit. The protection information can be stored in the memory unit by the operator of the machine tool or by the user.

According to one further form of embodiment, the protection information is contained at least partially in the control information and is provided to the machine tool together with the control information.

The protection information can, in particular, be part of the control information. The cryptographic key for protecting the production data can be contained in the control information. This can here be the same (private or secret) key as the key used for protecting the control information.

According to one further form of embodiment, the control information contains a reference for at least one part of the protection information and the at least one part of the protection information is provided to the machine tool via this reference.

The reference can be a URI (uniform resource identifier) or a URL (uniform resource locator). The machine tool can in particular receive the control information or a part thereof through the reference that is contained in the protection information. The referencing in particular enables a dynamic adaptation of the protection information.

The referencing is furthermore advantageous, in particular when a public key is used for the encryption of the data, since the corresponding public key can be loaded subsequently and does not have to be provided to the machine tool together with the protection information. The protection of the production data can thereby be improved.

According to a further form of embodiment, the protection information is modified dynamically. As suggested previously, the dynamic modification of the protection information takes place in particular in connection with the referencing of the protection information. The dynamic modification of the protection information can in particular be an adaptation of the protection information to relevant parameters. The protection information can, for example, be modified depending on a user of the machine tool.

According to a further form of embodiment, the control information is encrypted with a public cryptographic key that is used by the machine tool to encrypt production data.

The production data are in particular encrypted with the same key as the control information. An authorized, trustworthy device in particular only needs a single key (e.g. a secret key) or a single key pair (comprising, for example, a private cryptographic key) in order to read both the content of the production data as well as the content of the control information.

According to a further form of embodiment, decryption data that enable a decryption of protected production data are embedded in the manufactured product.

The decryption data can enable an immediate decryption of the production data. The decryption data can also alternatively enable the derivation of a key that finally enables the decryption of the production data.

The decryption data are, in particular, product-specific. To decrypt the production data, an external device in particular does not itself have to contain the decryption data but can read this from the product. The production data can differ from product to product, so that the production data are product-specific. As a result, only one user who has purchased the product can, for example, obtain the production data. It is for example possible to prevent the production data being obtained without possessing the product.

According to a further form of embodiment, the decryption data are stored in the manufactured product.

The decryption data can, for example, be stored in a memory component or a crypto-controller of the product provided for the purpose. The storage of the decryption data can take place during the manufacture of the product.

According to a further form of embodiment, the decryption data are determined by or depending on an encoded mechanical structure of the manufactured product, in particular a printed and/or milled barcode.

The encoded mechanical structure of the product is in particular obtained during the manufacture of the product. This can here be a surface property of the product, a 3D-printed barcode and/or a milled barcode. 1D barcodes and/or 2D barcodes are conceivable as the barcode.

A computer program product (non-transitory computer readable storage medium having instructions, which when executed by a processor, perform actions) is furthermore proposed which causes the method according to the first aspect or according to a form of embodiment of the first aspect to be carried out on a program-controlled device.

A computer program product such as, for example, a computer program means or computer program can, for example, be provided or supplied as a storage medium such as, for example, a memory card, USB stick, CD-ROM, DVD, or also in the form of a file downloadable from a server in a network. This can, for example, take place in a wireless communication network through the transmission of a corresponding file with the computer product or the computer program means or computer program.

According to a second aspect, a machine tool is proposed for the manufacture of a product. The machine tool comprises:

a manufacturing unit for manufacturing the product giving consideration to control information that controls the manufacture of the product;

a generation unit for the generation of production data during the manufacture of the product, wherein the production data describe the manufacture of the product;

a provision unit for the provision of protection information indicating which parts of the production data are to be protected and defining a protection method for these production data requiring protection; and a protection unit for the protection of those parts of the production data that are to be protected in accordance with the protection information with the protection method defined by the protection information.

The respective unit, for example the manufacturing unit, the generation unit, the provision unit or the protection unit can be implemented using hardware and/or software technology. In a hardware implementation, the respective unit can be designed as an apparatus or as part of an apparatus, for example as a computer or a microprocessor or as a control computer of a vehicle. In a software implementation, the respective unit can be designed as a computer program product, as a function, as a routine, as part of a program code or as an executable object.

According to one form of embodiment, the machine tool is suitable for carrying out the method according to the first aspect or according to a form of embodiment of the first aspect.

According to a further form of embodiment, the machine tool is a 3D printer.

The forms of embodiment and features described for the proposed method apply correspondingly to the proposed machine tool.

Further possible implementations of embodiments of the invention comprise combinations, even when not referred to explicitly, of features or forms of embodiment described above or below with reference to the exemplary embodiments. The expert will here also add individual aspects as improvements or extensions to the respective basic form of embodiments of the invention.

BRIEF DESCRIPTION

Some of the embodiments will be described in detail, with reference to the following figures, wherein like designations denote like members, wherein.

DETAILED DESCRIPTION

Elements that are the same or that have the same function are given the same reference signs in the figures unless otherwise stated.

Figure 1:
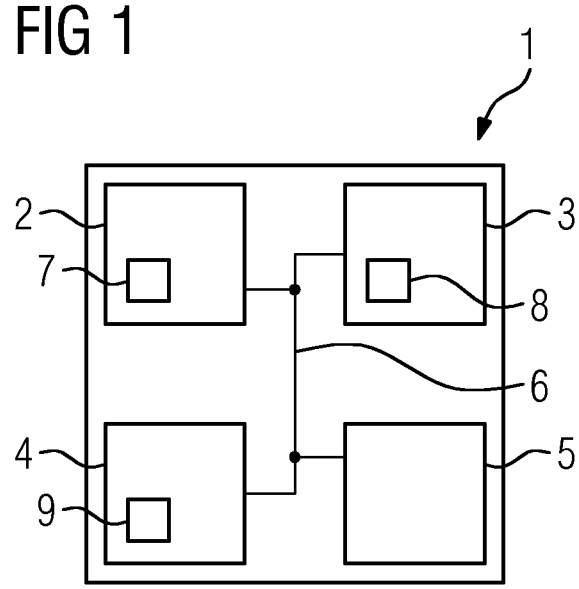
FIG. 1 shows a machine tool according to a first form of embodiment.

FIG. 1 shows a machine tool 1 according to one form of embodiment. The machine tool 1 is a 3D printer for printing/manufacturing products. Plastic spectacles (not illustrated) can, for example, be manufactured with the 3D printer 1.

The machine tool 1 comprises a manufacturing unit 2, a generation unit 3, a provision unit 4 and a protection unit 5 that are connected to one another via an internal cable 6.

The machine tool 1 is suitable for manufacturing the product according to a method for manufacturing a product. Such a method is illustrated, for example, in FIG. 2 which shows a method for the manufacture of a product according to a first form of embodiment.

Figure 2:
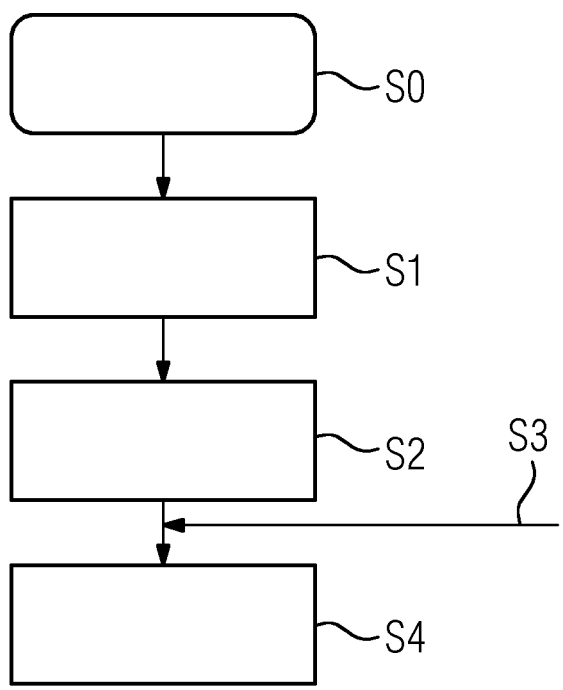
FIG. 2 shows a method for the manufacture of a product according to a first form of embodiment.

The method is described below with reference to FIGS. 1 and 2 together. The machine tool 1 is provided in a step S0.

The product is manufactured with the machine tool 1 in a step S1. The manufacture of the product takes place with the aid of the manufacturing unit 2 and taking into consideration control information 7 that is stored in the manufacturing unit 2. The control information 7 is stored permanently in the manufacturing unit 2. It specifies what steps, in what sequence and/or with what settings of the machine tool 1 the manufacturing unit 2 must carry out when manufacturing the product.

The control information 7 can, for example, specify that in a first step a left-hand, green spectacles arm is 3D-printed according to a first 3D printing program, that a blue spectacle lens carrier element is then 3D-printed according to a second 3D printing program, and that finally a right-hand, yellow spectacles arm is 3D-printed according to a third 3D printing program. The manufacturing unit 2 manufactures the product (the spectacles) according to the control information 7. The control information 7 is copy-protected by means of DRM.

Production data 8 are generated by the generation unit 3 in a step S2 during the manufacture of the product. The step S2 can be carried out in parallel with the step S1.

The production data 8 are log data that describe the manufacture of the product. This is, for example, temperature data that are acquired by the generation unit 3 during the manufacture of the product and which indicate a temperature of the machine tool, and measurement data that are acquired by the generation unit 3 during the manufacture of the product and which indicate dimensions of the manufactured product. The production data 8 can subsequently be analyzed in order to monitor proper manufacture of the product.

Protection information 9 is provided to the machine tool 1 in a step S3. The protection information 9 is stored in the provision unit 4 of the machine tool 1. The protection information 9 is already specified and stored in the provision unit 4 during an initialization of the machine tool 1. The protection information 9 is here unchangeable.

The protection information 9 indicates for all of the production data 8 generated in step S2 whether they are to be protected and, if relevant, how they are to be protected. How the protection of the production data 8 that are to be protected is to be done is specified according to a protection method defined by the protection information.

The protection information 9 defines different protection methods for different production data categories. The protection method defines that the production data 8 that describe the temperature of the machine tool 1 (first production data category) are to be provided in cryptographically encrypted form. A public cryptographic key for the cryptographic encryption of this production data 8 is provided by the protection information 9. The protection method further defines that the production data 8 that describe the dimensions of the product (second production data category) may not be provided to external devices.

In the step S3, the production data 8 are protected with the protection method giving consideration to the protection information 9. The production data 8 of the first production category are here encrypted with the public cryptographic key. The production data 8 of the second production category are furthermore stored in a protected memory, not illustrated, of the machine tool 1, and only used for internal purposes.

The protected production data 8 of the first production category can only be decrypted by a device that knows the private cryptographic key associated with the public cryptographic key. The protected production data 8 of the second production category are not provided outside the tool device 1. The contents of the production data 8 are thereby protected. It is also not possible for the control information 7 to be derived by unauthorized users from the production data 8, since an unauthorized user could not read the production data 8 at all.

Figure 3:
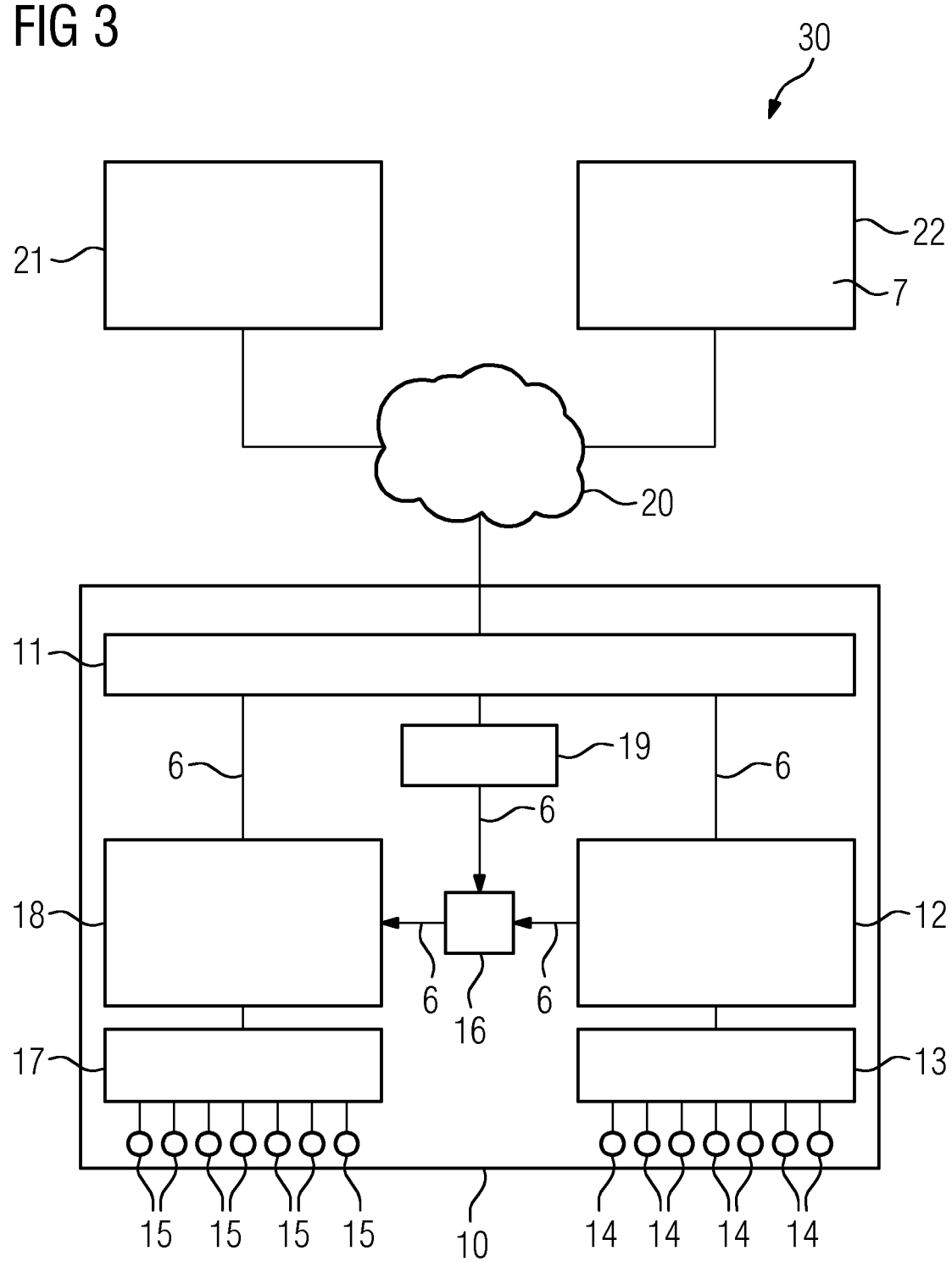
FIG. 3 shows an example of a manufacturing system with a machine tool according to a second form of embodiment.

FIG. 3 shows an example of a manufacturing system 30. The manufacturing system 30 comprises a machine tool 10 according to a second form of embodiment, an analysis device 21 and a marketplace 22 that are connected together over a network 20. The network 20 is, for example, the Internet or a mobile telephony network.

The machine tool 10 according to the second form of embodiment differs from the machine tool 1 according to the first form of embodiment inter alia in that the control information 7 and the protection information 9 do not have a permanent specification in the machine tool 10, but are first communicated from the marketplace 22.

In addition, the inner structure of the machine tool 10 according to the second form of embodiment is different from that of the machine tool 1 according to the first form of embodiment. The machine tool 10 comprises a communication interface 11, a control information memory unit 12, a manufacturing control unit 13, a plurality of actuators 14, a plurality of sensors 15, a protection information memory 16, a manufacturing acquisition unit 17, a protection unit 18 and a configuration interface 20.

The control information memory unit 12, the manufacturing control unit 13 and the actuators 14 together form a manufacturing unit. The sensors 15 and the manufacturing acquisition unit 17 together form a generation unit. The protection information memory 16 and the configuration interface 20 together form a provision unit.

Figure 4:
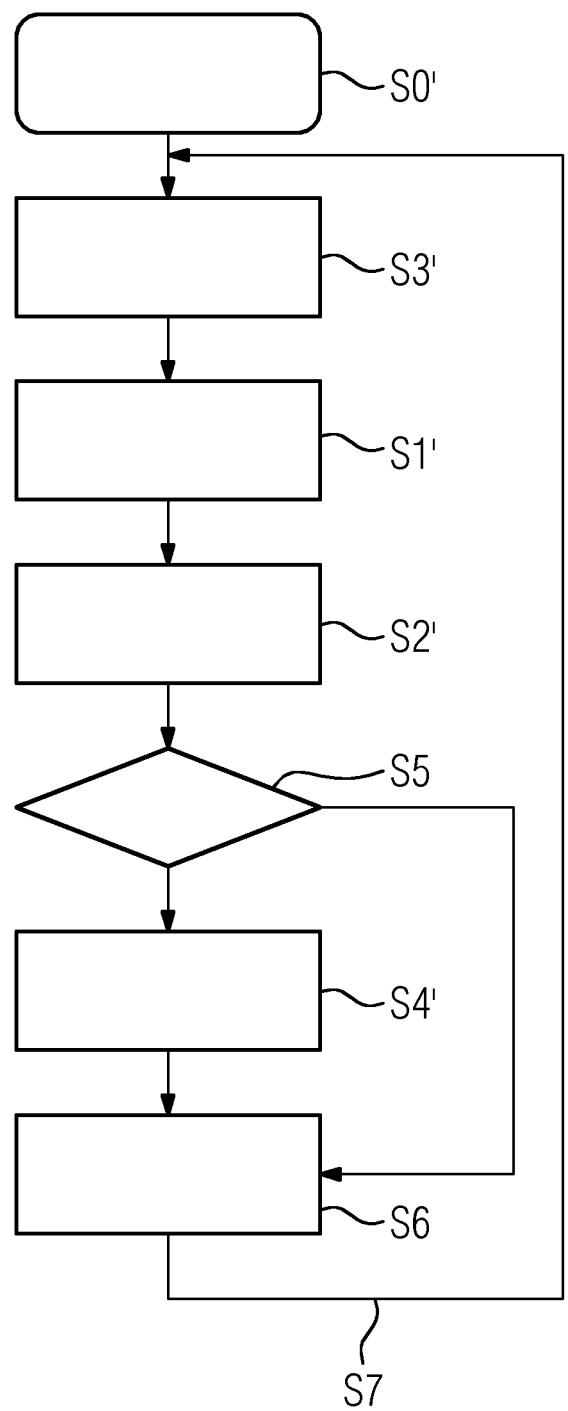
FIG. 4 shows a method for the manufacture of a product according to a second form of embodiment.

The machine tool 10 is suitable for carrying out a method for manufacturing a product. Such a method is illustrated, for example, in FIG. 4 which shows a method for the manufacture of a product according to a second form of embodiment. FIGS. 3 and 4 are described together below.

The steps S0', S1', S2' and S3' of the method according to the second form of embodiment correspond essentially to the steps S0, S1, S2 and S3 from the method according to the first form of embodiment. It is above all the differences between the forms of embodiment that are described in what follows.

In a preparation step S0', the machine tool 10, the analysis device 21 and the marketplace 22 are provided. The analysis device 21 can be considered as a device external to the machine tool 10.

In a step S3' the machine tool 10 receives the control information 7 and the protection information 9 from the marketplace 22. The marketplace 22 is, in particular, a central device in which control information 7 and protection information for different machine tools 10 are determined and sent to these machine tools 10.

The control information 7 and the protection information 9 are provided to the machine tool 10 via its communication interface 11. The control information 7 is stored in the control information memory unit 12. The protection information 9, which comprises a public cryptographic key for encrypting production data 8, is stored in the protection information memory 16.

The product is manufactured with the machine tool 10 in a step S1'. The actuators 14 are driven for this purpose by the manufacturing unit 13 with the aid of the control information 7 from the control information memory unit 12.

Production data 8 are generated by the machine tool 10 during the manufacture of the product in a step S2'. The sensors 15 acquire the manufacturing temperature and dimensions of the manufactured product for this purpose. The manufacturing acquisition unit 17 here drives the sensors 15 and passes the acquired production data 8 on to the protection unit 18.

Whether the production data 8 are to be protected is ascertained in a step S5. The step S5 is carried out with the use of the protection unit 18. The ascertainment of whether the production data 8 are to be protected is performed giving consideration to the protection information 9 stored in the protection information memory 16.

If it is ascertained in the step S5 that the production data 8 are to be protected, the production data 8 are protected in a step S4'. To protect the production data 8 that are to be protected, the protection unit 18 uses the public cryptographic key that was stored in the protection information memory 16 as part of the protection information 9.

The protected production data 8 are then transmitted to the analysis device 21 in a step S6. The machine tool 10 sends the protected production data 8 via the communication interface 11 to the analysis device 21 for this purpose.

The analysis device 21 is a trustworthy device that is permitted to read and analyze the contents of the production data 8. The private key associated with the public cryptographic key is provided to such trustworthy devices. The analysis device 21 thus has the private cryptographic key for decrypting the cryptographically protected production data 8. The analysis device 21 can decrypt the protected production data 8 with this key and use the production data 8 in order to check the proper manufacture of the product by the machine tool 10. Instead of an asymmetric cryptographic method with public encryption key and associated private decryption key, a symmetric cryptographic method that uses the same secret key for encryption and for decryption can be used in another variant. The secret key that is used to encrypt the production data 8 can here be contained in the control information 7. The secret key can be stored in the protection information memory 16.

The protection unit 18 of the machine tool 10 uses the secret key stored in the protection information memory 16 in order to encrypt the production data 8. An analysis device 21 in this case has the same secret key for decrypting the cryptographically protected production data 8.

The private key associated with the public cryptographic key, or the secret key for decrypting the cryptographically protected production data 8, is not provided to an untrustworthy device, i.e. a device that is not explicitly permitted to read and/or analyze the content of the production data 8. Such an untrustworthy device can thereby neither decrypt nor read the production data 8. This makes it impossible for the untrustworthy device to derive the control information 7 from the production data 8 and for the product to be replicated in an unauthorized manner.

A key market (not illustrated), from which an authorized analysis device 21 can request a private cryptographic key or secret cryptographic key used for the protection of production data 8, is provided in one variant. The analysis device 21 authenticates itself for this purpose to the key market 23 using a cryptographic authentication key or authentication token. The key market 23 checks whether the authenticated analysis device 21 is authorized to receive a requested cryptographic key for the decryption of cryptographically protected production data 8. If this is the case, the key market 23 provides the requested cryptographic key for the decryption of cryptographically protected production data 8 to the analysis device 21.

If it is ascertained in the step S5 that the production data 8 are not to be protected, the production data 8 are sent in the step S6 to the analysis device 21 in an unprotected form.

A dynamic updating of the control information 7 and/or of the protection information 9 takes place in a step S7. The marketplace 22 here transmits updated versions of the control information 7 and/or the protection information 9 to the machine tool 10.

In one form of embodiment, only a part of the protection information 9 is active at any one time. The active part of the protection information 9 can be determined by a user of the machine tool 10 through use of the configuration interface 19.

In a further form of embodiment, information regarding a current manufacturing step can be incorporated in the activation of the protection information 9 and/or in the protection of the production data 8.

Although embodiments of the present invention has been described on the basis of exemplary embodiments, it can be modified in diverse ways. Different keys can, for example, be used for the protection of different production data 8. The machine tools 1, 10 can, for example, also be milling machines or the like. The protection information 9 can also be provided to the marketplace 22 through a reference to the machine tool 1. The protected production data 8 can also be embedded in the product, for example as a barcode. The individual method steps can also take place in parallel with one another or in a sequence other than the one described.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for the manufacture of a product with a machine tool, comprising:

manufacture of the product with the machine tool giving consideration to control information that controls the manufacture of the product;

generation of production data by the machine tool during the manufacture of the product, wherein the production data describe the manufacture of the product;

provision of protection information to the machine tool indicating which parts of the production data are to be protected and defining a protection method for this production data requiring protection, wherein the protection information defines different protection methods for different production data categories, wherein the protection method determines whether the production data to be protected are to be provided in a restricted manner, are not to be provided, and/or are to be provided in cryptographically encrypted form, and wherein the protection information is modified dynamically; and protection of those parts of the production data that are to be protected in accordance with the protection information with the protection method defined by the protection information.

2. The method as claimed in claim 1, wherein each production data category comprises multiple production data which are at least one of generated during the manufacture of a single product and generated during the manufacture of different products with the machine tool.

3. The method as claimed in claim 1, wherein:

provision of the protected production data to at least one of a user, an external device, a memory device, a block chain, a cloud service, an Internet-of-things platform and a network.

4. The method as claimed in claim 1, wherein at least one of the protection information is stored in a memory unit of the machine tool;

the protection information is contained at least partially in the control information and is provided to the machine tool together with the control information; and the control information contains a reference for at least one part of the protection information and the at least one part of the protection information is provided to the machine tool via this reference.

5. The method as claimed in claim 1, wherein the control information is encrypted with a public cryptographic key that is used by the machine tool to encrypt production data.

6. The method as claimed in claim 1, wherein decryption data that enable a decryption of protected production data are embedded in the manufactured product.

7. The method as claimed in claim 6, wherein the decryption data are at least one of stored in the manufactured product and determined by or depending on at least one of an encoded mechanical structure of the manufactured product, a printed structure and milled barcode.

8. The machine tool for carrying out the method as claimed in claim 1.

9. A computer program product, comprising a computer readable hardware storage device having computer readable program code stored therein, said program code executable by a processor of a computer system to implement a method, comprising:

controlling manufacturing of a product with a machine tool giving consideration to control information that controls the manufacture of the product;

generating production data by the machine tool during the manufacture of the product, wherein the production data describe the manufacture of the product;

providing protection information to the machine tool indicating which parts of the production data are to be protected and defining a protection method for this production data requiring protection, wherein the protection information defines different protection methods for different production data categories, wherein the protection method determines whether the production data to be protected are to be provided in a restricted manner, are not to be provided, and/or are to be provided in cryptographically encrypted form, and wherein the protection information can be modified dynamically; and protecting those parts of the production data that are to be protected in accordance with the protection information with the protection method defined by the protection information.

10. A machine tool for the manufacture of a product, comprising:

a manufacturing unit for manufacturing the product to control information that controls the manufacture of the product;

a generation unit for the generation of production data during the manufacture of the product, wherein the production data describes the manufacture of the product;

a provision unit for the provision of protection information indicating which parts of the production data are to be protected and defining a protection method for these production data requiring protection, wherein the protection information defines different protection methods for different production data categories, wherein the protection method determines whether the production data to be protected are to be provided in a restricted manner, are not to be provided, and/or are to be provided in cryptographically encrypted form, and wherein the protection information can modified dynamically; and a protection unit for the protection of those parts of the production data that are to be protected in accordance with the protection information with the protection method defined by the protection information.

11. The machine tool as claimed in claim 10 that is a 3D printer.

* * * * *